I. E. COFFEY.
CONTROLLING APPARATUS FOR THE POWER TRANSMISSION MECHANISM OF MOTOR VEHICLES.
APPLICATION FILED SEPT. 27, 1913.
1,402,840. Patented Jan. 10, 1922.
3 SHEETS—SHEET 3.
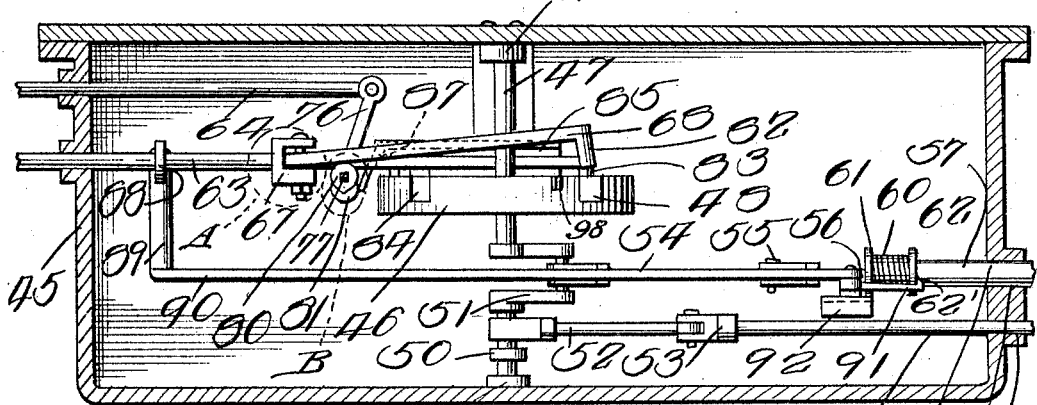
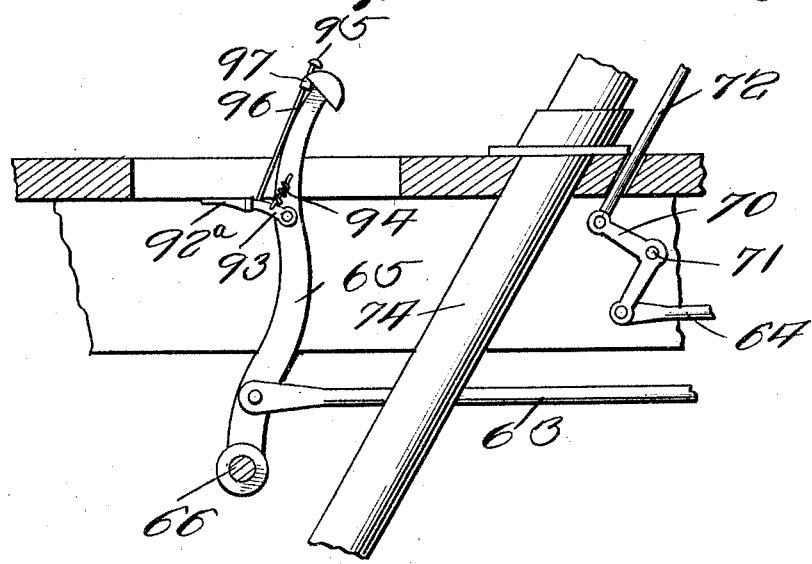
Inventor
Irven E. Coffey
Witnesses
By
Attorneys

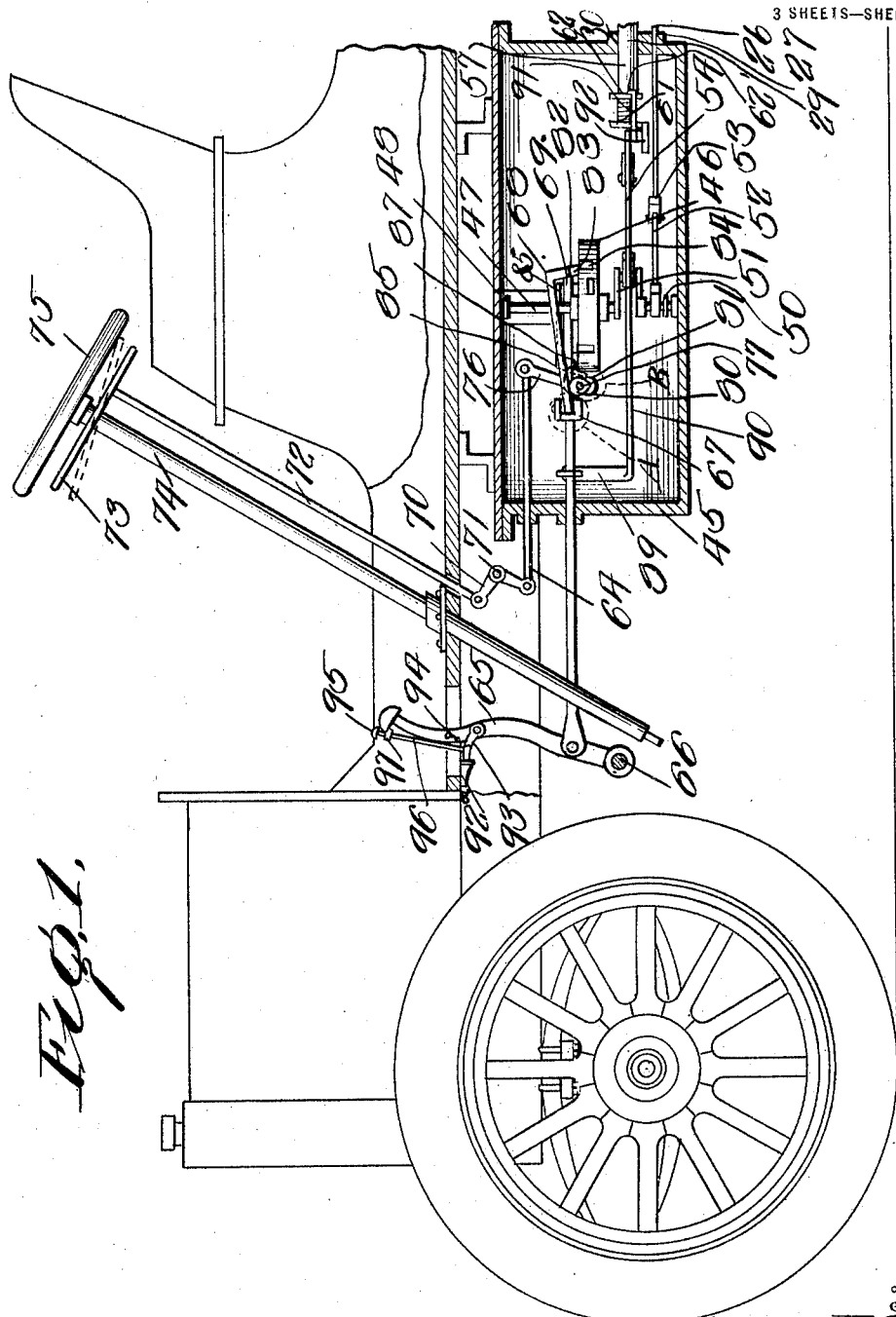

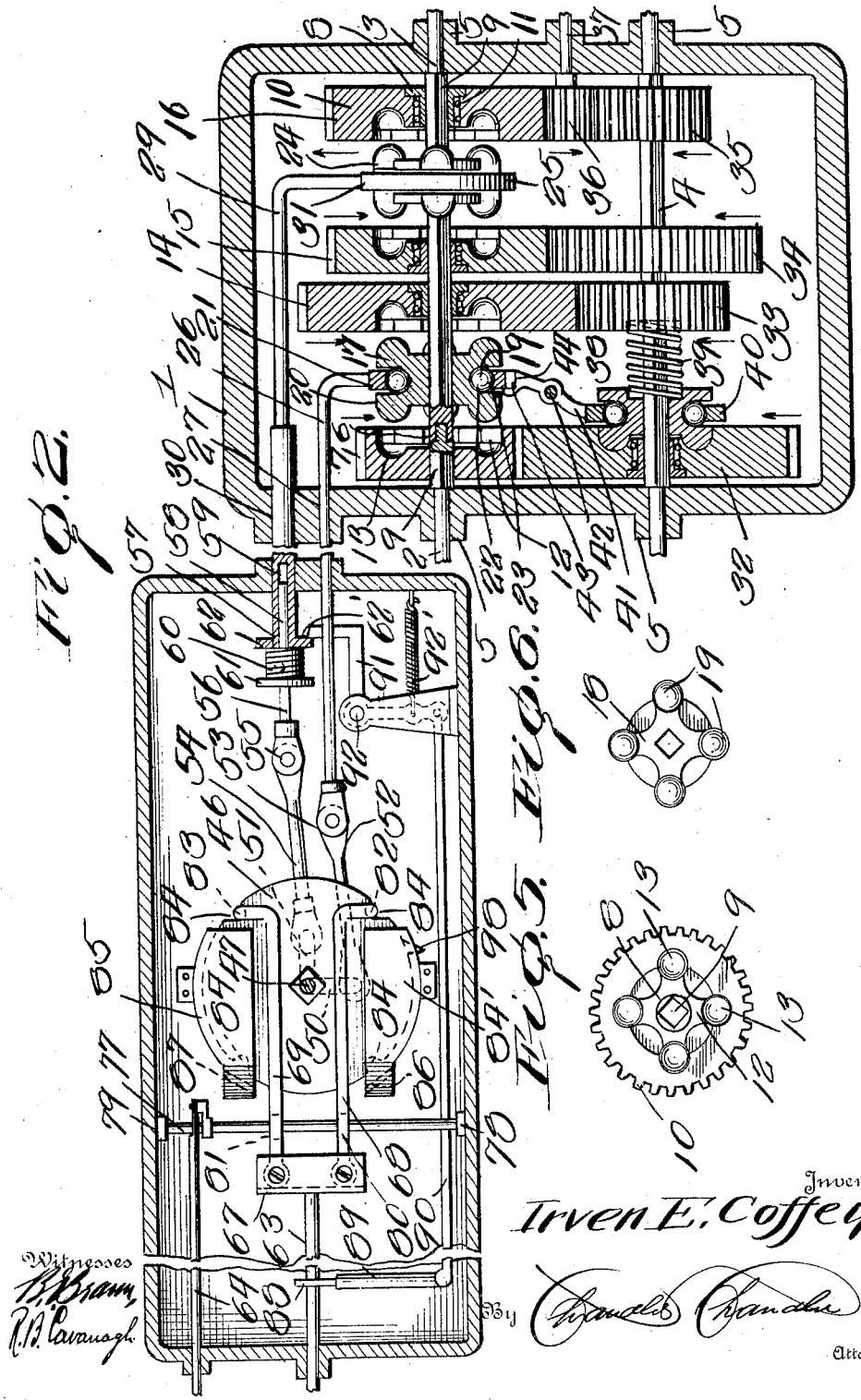

UNITED STATES PATENT OFFICE.

IRVEN E. COFFEY, OF LAWTON, OKLAHOMA.

CONTROLLING APPARATUS FOR THE POWER-TRANSMISSION MECHANISM OF MOTOR VEHICLES.

1,402,840.  Specification of Letters Patent.  Patented Jan. 10, 1922.

Original application filed March 30, 1911, Serial No. 617,919. Divided and this application filed September 27, 1913. Serial No. 792,166.

*To all whom it may concern:*

Be it known that I, IRVEN E. COFFEY, a citizen of the United States, residing at Lawton, in the county of Comanche, State of Oklahoma, have invented certain new and useful Improvements in Controlling Apparatus for the Power-Transmission Mechanism of Motor Vehicles; and I do hereby declare the following to be a full, clear, and exact description of the invention, such as will enable others skilled in the art to which it appertains to make and use the same.

This invention relates to certain novel and useful improvements in controlling and changing apparatus for the power transmission mechanism of motor vehicles, and the like, and is in the nature of a division of my earlier application, filed March 30, 1911, Serial No. 617,919.

In the present instance it is my purpose to provide controlling and changing devices for the power transmission mechanism of motor vehicles, whereby the change from one speed to another is accomplished by the operation of the clutch pedal of the machine, whereby the use of the usual hand operated shifting levers is dispensed with so that the driver may at all times have both hands on the steering wheel.

A further object is to provide means whereby it is impossible to throw the machine into gear without first releasing the clutch.

Another object is to provide a safety lock whereby it is impossible to throw the machine into reverse gear without using a special controlling device.

Still another object is to provide means whereby it is impossible to change at once from neutral to high speed but which will at the same time allow an instantaneous change from high speed to neutral.

With these and other objects in view my invention will be more fully described, illustrated in the drawings and then specifically pointed out in the appended claims, which are attached to and form a part of this application.

In the accompanying drawings which illustrate a preferred embodiment of my invention, Figure 1 is a side elevation partially in section of an automobile with my improved device applied thereto one of the cover plates being removed.

Figure 2 is a sectional plan view of the same.

Figure 3 is a side elevation partially in section of my improved mechanism one of the cover plates being removed.

Figure 4 is a detail elevation of a portion of my operating mechanism.

Figure 5 is a side elevation of one of the roller gears used in my improved transmission.

Figure 6 is a side elevation of one of the clutches used in connection with the gear wheel shown in Figure 5.

While the present invention relates primarily to the controlling and changing mechanism, in order to obtain a clear understanding of the operation and function of the entire apparatus, I will briefly describe the form of transmission mechanism which I have herein illustrated as employed in connection with the invention.

I have shown the transmission mechanism as wholly inclosed in the gear casing 1, and in this casing, are the crank shaft 2 from the engine, the drive shaft 3 and the jack shaft 4, all of these shafts being suitably journaled in bearings 5 formed in the walls of the casing. The meeting ends of the shafts 1 and 2 are joined by the joint 6 in such a manner that the two shafts may be rotated independently of each other. As this may be done in any manner desired, I have simply shown a conventional form.

All parts of the shafts included within the casing are squared and slightly larger than the shafts themselves.

Keyed upon the shaft 2 is a spur gear 7, the inner face of which is provided with a substantially cross-shaped recess 12, the ends of which terminate in the conical recesses 13.

The shaft 3 also carries the spur gears 14, 15 and 16 which are all similar in construction and consist, as best shown in Figure 5, each of a hub 8 with the squared bore 9 adapted to engage with the squared shaft 3 and the gear wheel proper 10 rotatably mounted upon the hub, roller bearings 11 being carried between the two to prevent excessive friction. By this means the shaft is free to rotate without rotating the gears. Each of the gears is provided with a recessed face, the recessed face of the gear 14 being toward that of the gear 7, while the recessed face of the gear 15 is opposed to the recessed face of the gear 16.

Between the gears 7 and 14 is a double faced clutch member 17 which is slidably mounted upon the shaft 3 and adapted to rotate therewith. Both faces of this clutch member are provided with extensions 18 corresponding in shape and size to the recesses 12 of the gears 7 and 14. These extensions carry upon their ends the laterally extending conical studs 19, slightly rounded at their points but otherwise corresponding to and adapted to engage with the recesses 13 of the gears 7 and 14. The cylindrical face of the member 17 is provided with an annular groove 20, the bottom part of which is semi-circular in section, and a collar 21 is loosely mounted in this groove, the inner face of the collar being provided with an annular groove 22, also semi-circular in section, the annular recess between these grooves forming a ball race for the bearing balls 23.

A similar clutch 24 is also carried by the shaft 3 between the gears 15 and 16, said clutch being also supplied with a collar 25 similar to the collar 21. A connecting rod 26 is slidably mounted in the casing at 27 and its inner end is extended downwardly and joined to the collar 21 at 28. A similar connecting rod 29 entering the casing at 30 is connected to the collar 25 at 31. The free ends of these rods extend forward and are connected to the control mechanism.

It will be seen from the above that by means of the rod 26 the clutch 17 may be thrown into engagement with either the gear 7 or 14, and that in a like manner the clutch 24 may, by means of the connecting rod 29, be thrown into engagement with either the gear 15 or the gear 16.

Mounted on the shaft 4 and meshing with the spur gear 7 is a spur gear 32 similar in construction to the gears carried by the shaft 3. Spur gears 33, 34 and 35 are keyed upon and rotate with the shaft 4, the gears 33 and 34 meshing with the gears 14 and 15 of the shaft 3 respectively, while the gear 35 meshes with a gear 36 rotatably mounted upon the stationary stub shaft 37 which is carried by the casing 1, this gear 36 meshing with the gear 16 of the drive shaft 3.

A clutch 38 similar to those upon the shaft 3, except that it has but one clutch face, is slidably mounted upon the shaft 4 between the gears 32 and 33 and is normally held into engagement with the gear 32 by the helical spring 39. The collar 40 of this gear has an upward extension 41 pivoted to the casing at 42. The free end of this extension terminates in the seat 43 which is engaged by the downward extension 44 of the collar of the clutch 17.

The direction of rotation of the spur gears being indicated by arrows, the operation of the transmission mechanism is as follows; all gears as shown in the drawings being stationary, with the exception of the gears 7 and 32. When the clutch 17 is thrown into engagement with the gear 14, the shaft 3 is rotated by means of the gears 7, 32, 33 and 14 which is the low gear. If the clutch 24 is thrown into engagement with the gear 15 the shaft revolves through the gears 7, 32, 34 and 15 which is the intermediate gear, while if the clutch 17 is thrown into engagement with the gear 7 the shafts 2 and 3 will be connected straight through which is high gear. Throwing the clutch 24 into engagement with the gear 16 the power is transmitted by means of the gears 7, 32, 35, 36 and 16 which is reverse. It will be seen from the above that in the high gear the clutch 38 is held out of its normal engagement with the gear 32 and therefore there is absolutely no motion of the shaft 4 and all gears are inactive on the high.

Referring now to the particular mechanism, which forms the subject matter of the present invention, and which is inclosed in the casing 45, it will be seen that it comprises the circular plate or wheel 46 keyed upon the vertical crank shaft 47 which is rotatably mounted in the casing by the bearings 48 and 49. The crank shaft 47 is provided with two crank members 50 and 51 at right angles to each other. A connecting rod 52 is pivotally connected at one end to the wrist pin of the crank 50, while its other end is pivotally connected to the ears 53 at the free end of the connecting rod 26. A connecting rod 54 joins the crank 51 to the ears 55 of the connecting rod 29 in the same manner. The connecting rod 29, however, is made up of two parts 56 and 57, the first of which, as is best shown in Figure 2, has a reduced portion 58 at one end adapted to telescope in the socket 59 in the other part. There is thus an expansion joint in the connecting rod 29 including a compression spring 60 which has one end secured to the rod member 56 as at 61 and the other end secured to a collar 62 which is keyed upon the rod 57. The collar 62 is provided with an enlarged bearing face 62', and it will be seen that by applying presssure upon said collar the rod 55 will be held against the action of the spring 60.

Slidably mounted in the opposite end of the casing 45 are two connecting rods 63 and 64. The first of these has its outer end pivotally connected to the foot pedal 65 which is pivoted to the frame of the car at 66 while its inner end is secured to the center of a bar 67 which carries the spring arms 68 and 69 one upon either end. The second of these rods, namely, 64, is connected by its outer end to one arm of a bell crank lever 70 which is pivotally secured to the frame of the car as at 71. The other arm of the lever 70 is connected by a rod 72 with a tilting wheel 73 which is pivotally mounted upon the casing of the steering post 74 immediately under the steering wheel 75. By this means the rod 64 may be operated by the driver without his removing his hands from the steering wheel. The inner end of the rod 64 is pivotally secured to the free end of a crank arm 76 which is keyed upon one end of a shaft 77, said shaft being mounted for rotation in the bearings 78 and 79. Cam rollers 80 are keyed upon this shaft one under each of the spring arms 68 and 69 against which they bear. It will thus be seen that the tilting of the wheel 73 will raise or lower the spring arms, and that this wheel and the parts connected therewith and operated thereby form a means for controlling the position of the arms 66 and 69, and thus also form a controlling means for the change of gears as will be later apparent.

The ends of these arms 68 and 69 terminate in downwardly extending studs 82 and 83, respectively, adapted to engage with the slots 84 formed in the upper outer portions of the plate 46, said slots being spaced apart at 90° from each other. Secured to the casing over either side of the plate 46 and spaced a slight distance above the same are the cover or guide plates 84' and 85 terminating at their forward ends in the spring clips 86 and 87, the purpose of which will be hereinafter explained.

Slidably mounted upon the connecting rod 63 and between the lever bar 67 and the casing 45 is a collar 88 formed in the end of the lateral extension 89 of the connecting rod 90, the free end of which is pivotally secured to the end of one arm of a bell crank lever 91, which is pivoted to the casing as at 92, the free end of said lever being adapted to bear against the face 62' of the collar 62 which is carried by the member 57 of the rod 56 and thus holds the joint in contracted position. The function of this connecting rod 90 is to actuate the lever 91 and thus permit the extension of the rod 55. A spring 92' co-acts with this lever 91 to normally hold it in engagement with the bearing face 62'.

To adapt it to this purpose the pedal 65 is arranged to act in two phases. One side of the slot through which the pedal operates is provided with a keeper 92ª adapted to engage a pawl 93 pivotally mounted upon the pedal 65, thus limiting the motion of the pedal. This pawl is nominally held in operative position by a spring 94, but may be thrown out of position by means of pressure applied to the head 95 of a push rod 96 which is slidably mounted in a bearing 97 carried by a pedal 65, the lower end of the push rod being pivotally secured to the pawl 93. When the pawl is thus thrown out of operative position the pedal is free for further motion and the bar 67 is then drawn against the collar 88 causing it, together with the connecting rod 90, to move, thereby causing the extension of the rod 56.

From the above description the operation of my transmission mechanism by my improved control system will be readily understood.

When in non-running or neutral position, the parts are in the position shown in the drawings. The engine is then started and the forward part of the wheel 73 tilted upward, which causes the cam roller 80 to revolve with the arm 68 raising it out of engagement with the clutch plate 46, the foot pedal 65 is then pushed forward which first releases the clutch and then pulls the rod 63 which connects to the bar 67, and as the arm 68 is raised this pulling action upon the arm 69 gives the clutch plate 46 a quarter turn, the arm 69 being held into contact with the plate meanwhile by the guide plate 84' under which it passes coming out through the spring clip 86. This turning of the plate 46 through its co-action with the connecting rods 52 and 26 throws the clutch 17 into engagement with the gear 14, thus throwing the transmission mechanism into low gear. The pedal 65 is then allowed to return to its original position letting in the clutch, the arm 69 passing back over the guide plate 84', it being prevented from entering under the same by the spring clip 86, until it falls into a slot 84 of the clutch plate 46. As soon as the car has obtained sufficient speed in the low gear and it is desired to go into the next higher speed the clutch pedal is again operated which again releases the clutch and revolves the clutch plate 46 one quarter turn which by means of the connecting rods 52 and 26 releases the clutch 17 from the gear 14 thereby throwing out the low speed and at the same time by means of the connecting rods 54 and 29 the clutch 24 is thrown into engagement with the gear 15 which is in the intermediate gear position thereby putting the mechanism in intermediate or second speed. Upon again repeating this operation the transmission mechanism is thrown from the intermediate speed into high gear. The next operation throws the transmission mechanism directly from high gear to neutral.

The expansion joint in the rod 29 allows the clutch 24 to engage with the gear 15, but acts as an automatic lock to prevent the clutch 24 from engaging with the reverse gear 16. In order to go into reverse the gears must be in neutral position, the clutch pedal 65 is then operated together with its pawl lever 96 which extends the rod portion 56 and throws the clutch 24 into engagement with the reverse gear 16.

When it is desired to go down from high gear to lower speed, the wheel 73 may be tilted to reverse position from that in which it has stood, while the transmission mechanism is still running on high gear, by which operation cam roller 80 lowers the arm 68 while the cam 81 raises the arm 69. This has no effect to change the gear, of course, and the mechanism may still continue to run on high gear until it is desired to go into the second speed, when the clutch pedal is operated and, by reason of the fact that the arm 68 is then engaged with the notch 84 in the plate 46, this plate will be turned in the opposite direction which will change the gear from high to intermediate, as will be readily understood. The next operation of the clutch pedal will throw out the intermediate gear and throw in the low gear, and the next operation will return the transmission mechanism to neutral. If the clutch pedal should again be operated the transmission mechanism would be placed in high gear again, directly from neutral, and to prevent this the plate 46 is provided with a stop 98 which will engage with the spring clip 86 as will be clearly understood by reference to Figure 2 in which these elements are shown. It will thus be seen that the wheel 73 and parts connected therewith and operated thereby form a controlling means for the change of gears and that this controlling means is operable entirely independent of the gear changing means itself and that it may be set while one gear is in operation to cause a change of gears on the next operation of the changing means, no matter how long a time may elapse between this setting of the controlling means and the actual changing of the gears.

While in high gear, by balancing the wheel 73 straight across, the arm 68 and the arm 69 are both raised and the spring 39 will immediately throw the clutch 38 into engagement with the gear 32, at the same time taking the clutch 17 out of engagement with the gear 7, thus leaving the gear in neutral position.

As will readily be seen from the above description, my transmission and control system are simple in construction and easy and effective in operation.

It is to be noted that when the clutch pedal is actuated to throw out the main clutch, the cross bar 67 will be actuated and through the mechanism hereinbefore described will place a set of the transmission gearing in position for operation. When the clutch pedal, however, is operated to throw out the main clutch a second time, it will move the cross bar 67 and return such set of transmission gearing and the connections therefor to neutral position, and this returning of such parts to neutral position is accomplished irrespective of the position of the tilting wheel or controlling mechanism 73 at such times, that is to say, the controlling mechanism may be in position for another set of transmission gearing at the time a set is going to neutral position without interfering with or preventing the movement of such set to such neutral position.

Further, it will be noted that when the cross bar 67 is drawn toward the front of the casing, it will move to neutral position any set of gearing which may happen to be out of such neutral position.

Another advantageous feature incident to my invention is that, as explained, the wheel 73 and parts connected therewith which form the controlling mechanism for the gear change, may be placed in position for another set of gearing while one set of gearing is in operation, this setting of the wheel 73 taking place prior to the actual change of gears and without affecting the operation of the gear in use. For instance, if the machine be traveling on a level road with the high gearing in use, and is approaching a hill or rough stretch of road where it may be desired to use the second or intermediate gearing, the wheel 73 may be tilted in the manner explained so that on the next operation of the clutch pedal, the intermediate gearing will be brought into operative position, but such intermediate gearing will of course not be thrown into operation until the foot pedal 65 is actuated. When the hill is reached it is only necessary for the operator to actuate the foot pedal 65, as before described, to make the change from high gearing to the second or intermediate gearing. If, however, upon reaching the hill the driver decides to continue on the high gearing, he may do so by failing to operate the foot pedal, as the mere fact that he has changed the position of the wheel 73 to that for the intermediate gearing, does not affect the operation of the transmission mechanism unless the pedal itself be actuated. Thus it will be seen that the controlling means including the wheel 73 and parts connected therewith, may be set for a relatively low gear while a relatively high gear is in operation, prior to changing to the lower gear, and without affecting the operation of the higher gear then in use.

It will be apparent from the foregoing description that I have provided a simple and efficient gear changing and controlling means adapted and arranged to operate a transmission mechanism without the aid of the ordinary gear change lever and H gate, the operating mechanism consisting wholly of the clutch pedal and the controlling means including the wheel 73 and parts connected therewith, the wheel being so positioned that it may be operated without removing the hands from the steering wheel.

It will further be seen that the tilting wheel 73 may be moved to a different position at any time without changing any gearing in the transmission mechanism until the clutch pedal 65 is actuated.

It will also be seen that the clutch is always released before any of the transmission gears are shifted and that the gears are always in position before the clutch is again thrown in.

I have also provided means whereby it is impossible to throw the machine into gear without first releasing the clutch or to reverse from any position but the neutral and then only by means of a special operating mechanism. Moreover, by my improved mechanism it is impossible to change at once from neutral to high, but the gear may be instantaneously changed from high to neutral.

What is claimed is:—

1. The combination with a changeable transmission gearing, of a pedal-operated link-and-lever gear changer therefor, and a manually-operable gear-changer-controlling means adapted, while the transmission gearing is in one of its changeable positions to be moved into position to cause a change of the transmission gearing to a different one of its changeable positions under the influence of the next operation of the gear changer.

2. The combination with a driving shaft and a driven shaft, of a relatively high-speed gearing and a relatively low-speed gearing constructed and arranged for interchangeable connection between the driving and driven shafts, a pedal-operated link-and-lever mechanism for shifting either gearing into active relation with the shafts and a manually-operable means for placing either gearing in shiftable relation to the shifting means while the other gearing is in active relation to the shafts.

3. The combination with a drive shaft, of a relatively high-speed drive gearing therefor and a relatively low-speed drive gearing therefor, said gearings being movable into and out of driving relation to the shaft, link-and-lever mechanism operable to move the gearings into driving relation to the shaft at different times, and manually-operable mechanical devices for controlling the gear-moving mechanism, said mechanical devices being constructed and arranged to be set, after the gear-moving mechanism has been operated to bring one gearing into operative position and while that gearing is in operative position, so that, on the next operation of the moving mechanism, the other gearing will be brought into operative position.

4. The combination with a transmission mechanism including a shiftable gear-changing element, of link-and-lever mechanism for shifting the said element to effect different gear changes, and manually-operable mechanical devices for altering the change of gears on operation of the shifting mechanism, said mechanical devices being operable independently of the shifting mechanism and while the transmission mechanism is in operation.

In testimony whereof, I affix my signature, in the presence of two witnesses.

IRVEN E. COFFEY.

Witnesses:
RICHARD B. CAVANAGH,
W. ELLIS CHANDLEE.